United States Patent Office 2,981,047
Patented Apr. 25, 1961

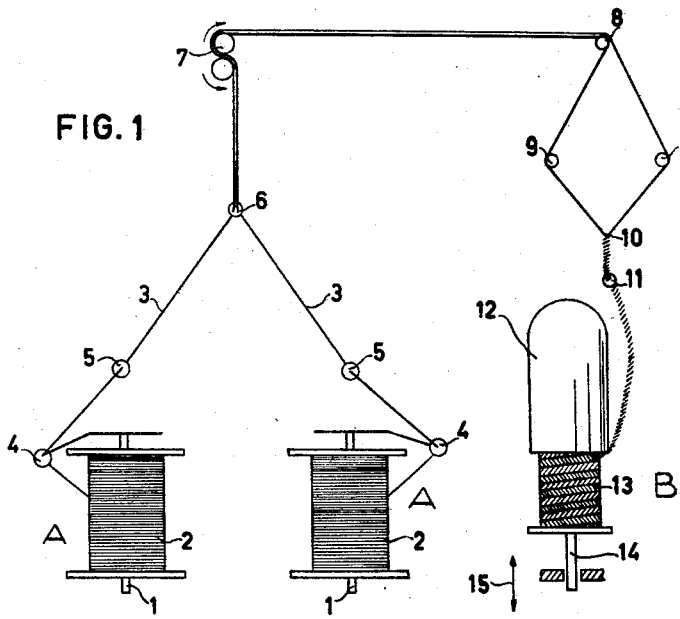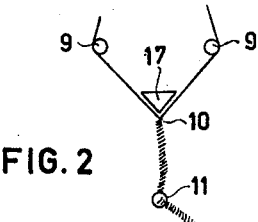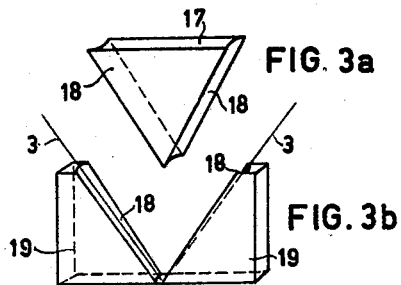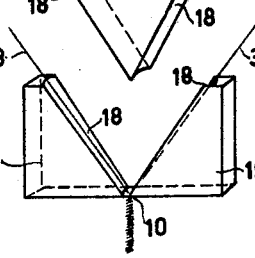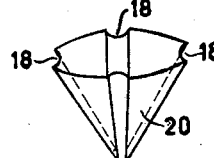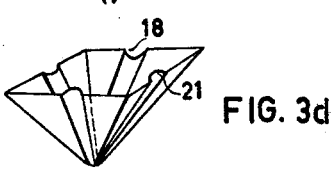

2,981,047

METHOD AND DEVICE FOR MANUFACTURING A TIRE CORD CONSISTING OF TWO ELEMENTS

Hubertus V. P. Heukensfeldt Jansen, Nijmegen, Netherlands, assignor to Kunstzijdespinnerij Nyma N.V., Nijmegen, Netherlands, a limited-liability company of the Netherlands Filed June 3, 1957, Ser. No. 663,160

2 Claims. (Cl. 57—60)

The present invention relates to a method for manufacturing a tire-cord consisting of at least two filaments or elements. The invention also relates to a device for carrying out said method. The aim of the invention is to manufacture tire-cord with improved properties.

The twisting operation of several elements is very well known per se. In the manufacture of tire-cord, however, it is very important to maintain uniform tension in the cord.

Now it has been found that said desirable uniform tension can be obtained by twisting in such a way that two of said elements always form a Y with the corded elements. Naturally, when twisting more than two elements the legs of that Y are not positioned in one single plane. If in the following description and claims there is reference to the Y, the spatial Y is meant. Such spatial Y occurs when cording more than two elements.

It appeared that the Y twisting operation was especially advantageous in the manufacture of tire-cord in one single operation. When using a single operation, the elements are twisted and then supplied to a twisting device for the joined elements in which the proper cording operation takes place and in which the separate elements are back twisted again.

In the discontinuous system the elements are twisted separately and wound on the bobbins. The elements thus twisted are treated subsequently in the cording-twisting device.

It appears that a cap-twisting spindle was particularly suitable as a cording-twisting device for the Y twisting operation.

Preferably the operation takes place in such a way that the legs of the Y which are formed by the elements have a length of at least 10 cm. Furthermore it appears to be advantageous to fix the point at which the elements join each other.

The most advantageous effect of the Y twist appeared in the manufacture of tire-cord in one single operation as well as in the discontinuous manufacture.

Devices for carrying out the methods described and also the tire-cord produced by said methods are included in the invention.

By way of example, embodiments of the device according to the invention are shown in the drawings.

Figure 1 shows a general view of the arrangement of the twisting spindles.

Figure 2 shows a portion of Figure 1 in which the twisting point has been fixed.

Figures 3a, b, c and d show several twisting wedges.

In Fig. 1 two twisting devices A are indicated for two elements, said devices being carried out as flyer twisting spindles, and a twisting apparatus B for the corded elements, said apparatus being carried out as a cap twisting spindle.

The flyer twisting device A for the elements is provided in the usual way with a rotating spindle 1 with which the bobbin 2 on which the element 3 has been wound is rotated. The elements 3 are guided to the advancing rolls 7 via the flyer 4 and the thread guides 5 and 6. Then they are guided to the twisting apparatus B via the guiding members 8, 9 and 11. The elements are twisted between the twisting device A and the advancing rolls 7. The twisted elements are simultaneously directed to separate guiding members 9, their twisting condition remaining unchanged. Finally the cording operation takes place between the guiding members 9 and the cap twisting apparatus B. The position of the joint 10 (twisting point) in which the elements join each other is determined by the tension of the cord. Said tension is determined by the level of the thread guide 11 and by the number of revolutions of the cap-twisting apparatus.

The tire-cord thus formed is collected onto the bobbin 13 which is provided with the cap 12 and the rotation spindle 14. It is diagrammatically indicated with the arrows 15 that the bobbin 13 also moves up and down in order to obtain the desired bobbin shape.

In Figure 2 a portion of a device according to Figure 1 is shown in which the twisting point 10 is fixed by means of a twisting wedge 17.

In the Figures 3a, 3b, 3c and 3d, various embodiments which are preferred are shown for members which fix the twisting points.

Figure 3a partially shows the twisting wedge of Figure 3; a three cornered plate 17 is provided with grooves 18 for guiding the threads.

Figure 3b shows an arrangement of two three cornered plates 19 also provided with grooves 18 supporting the element 3.

Figure 3c shows a cone 20 provided with four grooves 18 suitable for fixing the twisting point when carrying out the cording operation of four elements.

Figure 3d shows a pyramid 21 also for cording purposes of four elements.

The invention will further be elucidated with the aid of the following examples:

*Example 1*

The device according to Figure 1 was used with the only difference that the guiding members 9 had been removed.

Two elements of 1650 denier having a twist of 70 Z were used, said elements being wound onto twisting spindles A. The advancing rollers and the numbers of revolutions were adjusted in such a way that the elements obtained a twist of 470 Z between the spindles A and the advancing rollers 7, there being carried out a cording operation by means of the cap-twisting spindle B up to a twist of 470 S and the twist being returned to 0 in the various separate elements.

Thus the following figures were obtained:

|  | Kg. |
|---|---|
| Breaking load of the element | 6.0 |
| Breaking load of the cord | 9.4 |

After the twisting operation thus $$\frac{9.4}{12} \times 100 = 78\%$$

of the breaking load was maintained, with other words the efficiency of the cord was 78%.

The breaking load was determined after conditioning in a room with a relative humidity of 65%.

*Example 2*

The same device as in Example 1 was used, the guiding rolls, however, being present. Said rolls 9 were arranged in such a way that the distance between the guiding rolls and the twisting point (distance 9—10) was 5 cm. In this way a cord efficiency of 84% was found.

*Example 3*

In a similar way as in Example 2 the cording twisting operation was carried out, the distance 9—10, however, being adjusted at 10 cm. In this way a cord efficiency of 86% was found. By repeating these tests using distances 9—10 of 13 and 17 cm. the cord efficiency remained approximately 87%.

*Example 4*

Example 3 was repeated, except that use was made of the twisting wedge 17. The cord efficiency was 88%.

*Example 5*

Similarly to the preceding examples also a ring twisting apparatus was used, which is not shown. Furthermore a twisting operation was carried out continuously and discontinuously.

The results of said tests are indicated in the following list.

For the sake of completeness of this list, the results of the first four examples are also mentioned.

| Ex. | Continuous or discontinuous | Cording app. | Y twist | distance 9-10, cm. | twisting wedge | cording efficiency, Percent |
|---|---|---|---|---|---|---|
| 5a | discontinuous | ring | no |  | no | 74 |
| 5b | do | cap | no |  | no | 76 |
| 5c | continuous | ring | no |  | no | 76 |
| 1 | do | cap | no |  | no | 78 |
| 5d | discontinuous | ring | yes | 10 | no | 82 |
| 5e | do | cap | yes | 10 | no | 84 |
| 5f | continuous | ring | yes | 10 | no | 84 |
| 2 | do | cap | yes | 5 | no | 84 |
| 3 | do | do | yes | 10 | no | 86 |
| 5g | discontinuous | ring | yes | 10 | yes | 84 |
| 5h | do | cap | yes | 10 | yes | 86 |
| 5i | continuous | ring | yes | 10 | yes | 86 |
| 4 | do | cap | yes | 10 | yes | 88 |

It is observed that also when the twisting operation was a discontinuous one and when using a ring cording apparatus the favorable effect of the Y twist was obvious if the distance 9—10 was selected at at least 10 cm. Here also the cording efficiency was lower if the distance 9—10 was 5 cm. and the cording efficiency did not increase substantially if that distance was larger than 10 cm.

The above examples show clearly the effect of the Y twist, the choice of the length of the legs of the Y and the fixed point of the twisting operation. Further it appears that the best results are obtained by an additional continuous twisting operation and by using a cap-twisting spindle.

The surprising favorable influence of the Y twist probably is due to the fact that between the points 9 and 10 the twist in the various separate elements substantially is turned back so that the proper cording operation commences with elements in which the twist already is brought back to 0.

If the guiding rolls 9 are left out the cording operation and the reverse turning of the twist in the elements namely occur simultaneously. Then it is also clear that the distance 9—10 must have a certain value; the reverse of the twist in the elements must take place over a predetermined distance so that local twist differences are equalized as much as possible. The following is observed with regard to the twisting wedge. Without the use of said auxiliary apparatus it is observed that the twisting point permanently makes transverse, be it small, up and down movements. As is demonstrated in the above the prevention of said movement is favorable. Here also it is demonstrated how the removal of small irregularities during the twisting operation gives better results.

What is claimed is:

1. A method of manufacturing tire cord which comprises subjecting at least two filaments to the action of twisting instrumentalities; jointly advancing the filaments from the twisting instrumentalities without changing their twisted condition; subjecting the filaments to the spreading action of separate guide members; directing the filaments to a twisting point and simultaneously untwisting the filaments; and twisting the filaments into a cord by subjecting the filaments to the action of a cap twisting apparatus in such manner that the cord defines one leg of a Y and the filaments between their guide members and the twisting point define other legs of the Y, the cap twisting apparatus imparting to the filaments a twist in a direction opposite to that imparted to said filaments by the twisting instrumentalities.

2. An apparatus for producing a cord from a plurality of filaments which comprises, in combination: a flyer twisting device for each filament; advancing means for the filaments; first guide means for directing the filaments from respective flyer twisting devices to said advancing means; second guide means for jointly guiding the filaments from said advancing means in such manner that the twisted condition of the filaments remains unchanged; a cap twisting apparatus for twisting the filaments into a cord at a point spaced from said second guide means and in a direction opposite to that imparted to the filaments by said flyer twisting devices; and third guide means, one for each filament, disposed between said second guide means and said point for untwisting the filaments and for spreading the filaments in such manner that the cord defines one leg of a Y and each filament defines another leg of the Y between said point and the respective one of said third guide means.

References Cited in the file of this patent

UNITED STATES PATENTS

| | | |
|---|---|---|
| 353,036 | Palmer | Nov. 23, 1886 |
| 1,390,081 | Bonner | Sept. 6, 1921 |
| 1,672,083 | Palmer | June 5, 1928 |
| 2,053,609 | Gwaltney | Sept. 8, 1936 |
| 2,131,893 | Jessen | Oct. 4, 1938 |
| 2,346,358 | Busse | Apr. 11, 1944 |
| 2,795,925 | Parker et al. | June 18, 1957 |
| 2,897,647 | Woods | Aug. 4, 1959 |

FOREIGN PATENTS

| | | |
|---|---|---|
| 348,161 | Great Britain | May 6, 1931 |